US010999325B1

(12) United States Patent
Chandana et al.

(10) Patent No.: US 10,999,325 B1
(45) Date of Patent: May 4, 2021

(54) CLOUD SECURITY SYSTEM IMPLEMENTING SERVICE ACTION CATEGORIZATION

(71) Applicant: Skyhigh Networks, Inc., Campbell, CA (US)

(72) Inventors: Sandeep Chandana, Fremont, CA (US); Sekhar Sarukkai, Cupertino, CA (US)

(73) Assignee: Skyhigh Networks, LLC, Campbell, CA (US)

( * ) Notice: Subject to any disclaimer, the term of this patent is extended or adjusted under 35 U.S.C. 154(b) by 394 days.

(21) Appl. No.: 15/789,658

(22) Filed: Oct. 20, 2017

(51) Int. Cl.
*H04L 29/06* (2006.01)

(52) U.S. Cl.
CPC .......... *H04L 63/20* (2013.01); *H04L 63/1425* (2013.01); *H04L 63/205* (2013.01)

(58) Field of Classification Search
CPC ... H04L 63/20; H04L 63/1425; H04L 63/205; H04L 29/06
USPC ............... 726/3, 13, 23, 25, 1; 709/223, 224
See application file for complete search history.

(56) References Cited

U.S. PATENT DOCUMENTS

| | | | | |
|---|---|---|---|---|
| 6,453,307 | B1 * | 9/2002 | Schapire | G06N 20/20 706/12 |
| 9,722,895 | B1 * | 8/2017 | Sarukkai | H04L 67/22 |
| 10,154,007 | B1 * | 12/2018 | Viswanathan | H04L 63/20 |
| 2012/0265976 | A1 * | 10/2012 | Spiers | G06F 9/45533 713/2 |
| 2014/0201836 | A1 * | 7/2014 | Amsler | H04L 63/20 726/23 |
| 2014/0282844 | A1 * | 9/2014 | Devetter | H04L 67/1097 726/1 |
| 2015/0254555 | A1 * | 9/2015 | Williams, Jr. | G06N 3/0454 706/14 |
| 2015/0319185 | A1 * | 11/2015 | Kirti | H04L 67/306 726/23 |
| 2016/0094567 | A1 * | 3/2016 | Borland | H04L 63/0457 713/154 |

(Continued)

OTHER PUBLICATIONS

"Marianthi Theoharidou, Nick Papanikolaou, Siani Pearson, Dimitris Gritzalis, Privacy Risk Security Accountability in the Cloud", Cloud Computing Technology and Science (CloudCom) 2013 IEEE 5th International Conference on, vol. 1, pp. 177-184, 2013. (Year: 2013).*

(Continued)

*Primary Examiner* — Saleh Najjar
*Assistant Examiner* — Khalid M Almaghayreh
(74) *Attorney, Agent, or Firm* — Byrne Poh LLP

(57) ABSTRACT

A service action category based cloud security system and method implement cloud security by categorizing service actions of cloud service providers into a set of service action categories. The service action categorization is performed agnostic to the applications or functions provided by the cloud service providers and also agnostic to the cloud service providers. With the service actions of cloud service providers thus categorized, cloud security monitoring and threat detection can be performed based on service action categories. Thus, cloud security can be implemented without requiring knowledge of the applications supported by the cloud service providers and without knowing all of the individual service actions supported by the cloud service providers.

18 Claims, 7 Drawing Sheets

(56) References Cited

U.S. PATENT DOCUMENTS

| | | | | |
|---|---|---|---|---|
| 2016/0119365 A1* | 4/2016 | Barel | .................. | G06F 16/84 |
| | | | | 726/12 |
| 2016/0321243 A1* | 11/2016 | Walia | .................. | G06F 16/322 |
| 2016/0371489 A1* | 12/2016 | Puri | .................. | H04L 63/1425 |
| 2018/0032599 A1* | 2/2018 | Larsen | .................. | G06F 16/906 |
| 2018/0375886 A1* | 12/2018 | Kirti | .................. | H04L 63/104 |
| 2019/0098037 A1* | 3/2019 | Shenoy, Jr. | .................. | H04L 63/105 |
| 2019/0155918 A1* | 5/2019 | Jaroch | .................. | G06N 3/084 |
| 2019/0327318 A1* | 10/2019 | Andrade | .................. | G06Q 10/0633 |

OTHER PUBLICATIONS

International Search Report and Written Opinion dated Jan. 15, 2019 in International Patent Application No. PCT/US2018/056902.

\* cited by examiner

Service Action Category Mapping Database

| CSP | Service Action Name | Service Action Category |
|---|---|---|
| Box.com | File Copy | Data Sharing |
| Box.com | File Comment Added | Data Access |
| Box.com | Shared Links Updated | External Data Sharing |
| Box.com | Create User | User Account Creation |
| Salesforce.com | Create Lead | Data Access |
| Salesforce.com | Update Role/Sub Role | Administration |
| Exchange Online | Mailbox login | Login Success |
| OneDrive | Files uploaded to document library | Data Upload |
| Amazon Web Services | DeleteVolume | Data Delete |
| Amazon Web Services | StartLogging | Service Usage |
| Google Drive | Change document access scope | Data Sharing |

Fig. 4

CLOUD SECURITY SYSTEM IMPLEMENTING SERVICE ACTION CATEGORIZATION

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

In particular, an enterprise, through its information security officer, may monitor the network activities traveling to and from the enterprise to detect for suspicious user activities or network activities that may present risks to the enterprise. However, with the enterprise and users of the enterprise adopting a large number of cloud-based services, each cloud-based service providing a different application, it becomes challenging for the enterprise to effectively monitor network activities related to these cloud-based services. Furthermore, the information security officer of the enterprise may not have full knowledge of all of the applications provided by the cloud-based servicers, making effective monitoring of cloud-based network activities very difficult.

BRIEF DESCRIPTION OF THE DRAWINGS

Various embodiments of the invention are disclosed in the following detailed description and the accompanying drawings.

FIG. 4 illustrates an example of service action category mapping database 54 storing service action to service action category mapping data in some embodiments.

DETAILED DESCRIPTION

Figure 1:
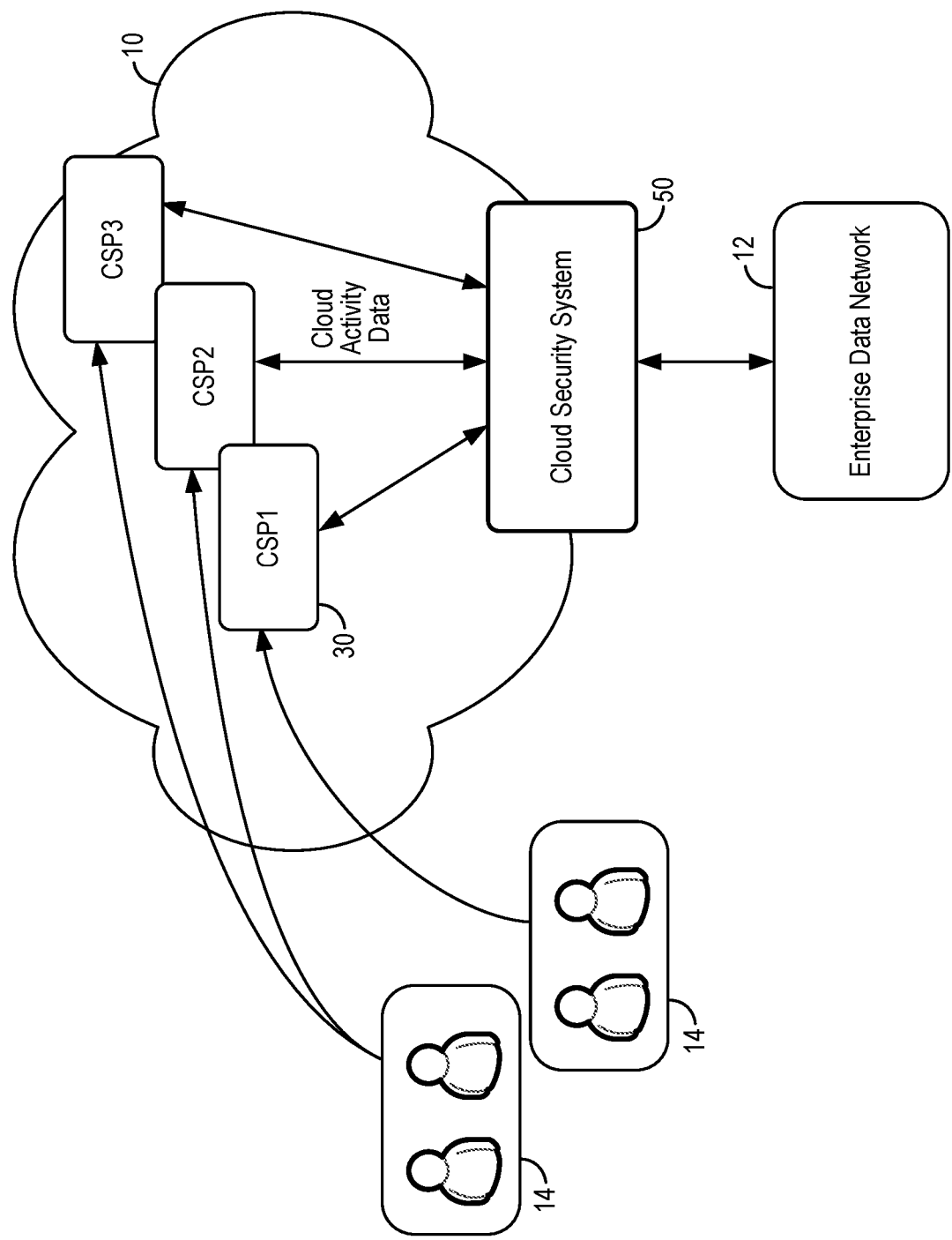
FIG. 1 illustrates an environment in which a cloud security system and method of the present invention can be implemented in some embodiments.

The invention can be implemented in numerous ways, including as a process; an apparatus; a system; a composition of matter; a computer program product embodied on a computer readable storage medium; and/or a processor, such as a processor, or a hardware processor, configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a cloud security system and method implements a service action categorization method to provide cloud security based on service action categories. In some embodiments, the cloud security system and method implements cloud security by categorizing service actions that cloud service providers support, into a set of service action categories. The service action categorization is performed agnostic to the applications or functions provided by the cloud service providers and also agnostic to the cloud service providers. With the service actions of cloud service providers thus categorized, cloud security monitoring and threat detection can be performed using the service action categories. Thus, cloud security can be implemented without requiring knowledge of the applications supported by the cloud service providers and without knowing all of the individual service actions supported by the cloud service providers, by having to only know the generic service action categories. By grouping the service actions of the cloud service providers into a limited number of categories, the cloud security system and method enables rapid detection of threats by monitoring cloud activities based on service action categories rather than monitoring individual cloud activities.

In some embodiments, the cloud security system and method performs service action categorization using user role identification. An uncategorized service action is evaluated based on the role of the user requesting or making the service action where the user's role refers to the job function or responsibility of the user within the enterprise. The user's role or job function informs the nature of the service action and is used effectively in the cloud security system and method of the present invention to predict a category for the service action, without having to know exactly what the service action is doing.

In another embodiment, the cloud security system and method performs service action categorization using an intent and sequence based contextual identification. A uncategorized service action is evaluated based on the intent of the connection session and the sequence of service actions within the connection session. The intent of the connection session and the sequence of service actions can inform the nature of a particular service action within the sequence and can be used effectively in the cloud security system and method of the present invention to predict a category for the service action, without having to know exactly what the service action is doing.

By implementing service action categorization using user role identification or using intent and sequence based contextual identification, the accuracy of the service action categorization is significantly improved and the threat detection based on service action categories can be made more effective.

As enterprises adopt the use of more and more cloud based services and users of the enterprises access the cloud based services to utilize the myriad of cloud applications supported by these cloud based services, enterprises face challenges in ensuring security for the enterprises' data and network in connection with the use of cloud based services. The cloud security system and method of the present invention realizes improvements to cloud security technology for protecting an enterprise data network from access control risks, from data loss prevention, from data compliance risks and other security risks arise from the use of cloud based services. In order to implement effective cloud security protection and to enforce desired security policies, an enterprise has to be able to accurately detect threats or anomaly in the massive amount of network activities between the users and the cloud-based service providers, where the network activities may or may not traverse the enterprise's own data network. In order to accurately access risk, the enterprise wishes to have insight into the activities to and from the cloud-based services. Conventional security systems are often focused on specific cloud applications or specific cloud-service providers. Alternately, conventional security systems often require the information technology officer of the enterprise to have knowledge of each of the services provided by each cloud-based services used by the enterprise in order to implement the appropriate security policies.

On the other hand, the cloud security system and method of the present invention enables evaluation of the network activities based on service action categories so that more accurate threat and anomaly monitoring and detection can be realized. Instead of evaluating individual network activity, the cloud security system and method of the present invention enables security analysis to be performed on a class or a category of service actions. In this manner, an information technology officer of an enterprise can establish security policies for each category of service actions to implement effective security protection.

Furthermore, the cloud security system and method of the present invention enables implementation of effective cloud security without requiring the information technology officer to have knowledge of the underlying cloud applications or services provided by the cloud-based service providers. With the myriad number of cloud-based services being employed by an enterprise, it becomes challenging for information security officers of the enterprise to become knowledgeable about each and every one of the cloud-based services, what cloud applications are offered and what service actions are supported. The service action category based cloud security system and method of the present invention performs categorization of service actions without requiring a priori knowledge of the nature of the cloud-based services. Accordingly, the service action category based cloud security system and method of the present invention can be deployed quickly to provide security protection regardless of the nature of the business of the enterprise and regardless of the nature of the cloud-based services being monitored.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. The cloud computing model enables ubiquitous and on-demand access to a shared pool of configurable computing resources which can be rapidly provisioned and released with minimal management effort. As an example, cloud computing and storage solutions provide enterprises with capabilities to store and process their data in third-party data centers, realizing efficient implementation and economy of scale. In other examples, the cloud-based service may be a cloud storage service, customer relationship management (CRM) services, information technology (IT) services or other types of cloud services.

In the present description, the terms "application" and "cloud application" are used interchangeably to refer to a software application developed by a cloud-based service to be executed on a public or private data network, such as the Internet and an enterprise data network. Furthermore, in the present description, the term "service action" refers to an action that can be taken within a cloud-based service. A service action has associated semantics to determine the object or subject of the action and the acts to be taken with the object or subject. Example service actions may include "Activate User", "Add Event to Outlook", "Calendar Shared", "Change Password", "Change user access", "View Contacts", "GetResources", "Opened a link", "GetApiKeys", etc. Each cloud service provider may use a different name for the same service action or may have a different definition for a service action of the same name. Each cloud service provider defines its own set of service actions it supports and uses its own set of names or labels for those service actions. The same or similar service actions in various cloud service providers may be given different service action names. Alternately, different service actions in various cloud service providers may be given the same or similar service action name. As such, the ability to competently monitor the cloud activities of the enterprise becomes difficult with the large number of service actions being communicated between the cloud service providers with names or labels that may indicate the same operation or different operations.

Table 1 below illustrates examples of how different cloud service providers use different names for the same action.

Example 1: When an Administrator Adds a User to an Internal Group

| Service Action | Cloud Service Provider |
| --- | --- |
| Add Member to Group | AzureAD |
| Add User in Group | Atlassian JIRA |
| Add-Role Group Member | Exchange Online |
| Add/Remove Members from Group | Jive Hosted |
| Added to Group | OneDrive, Sharepoint |

Example 2: When a User Downloads Data from the Cloud Service

| Service Action | Cloud Service Provider |
| --- | --- |
| Download Doc | Salesforce |
| Download File | Box, Dropbox |
| Download Word Doc as PDF/PPT/ODT | OneDrive |
| File Downloaded | Sharepoint |
| Files Downloaded to Computer | OneDrive |

FIG. 1 illustrates an environment in which a cloud security system and method of the present invention can be implemented in some embodiments. Referring to FIG. 1, an enterprise, operating an enterprise data network 12, may adopt the use of one or more cloud-based services provided by cloud service providers (CSP) 30, such as CSP1, CSP2 and CSP3 shown in FIG. 1. The users or employees 14 of the enterprise may access the cloud-based services on behalf of the enterprise. Often, the users of the enterprise may access the cloud-based services directly, without going through the enterprise data network 12. In some cases, the enterprise may deploy a network intermediary (not shown) and configure the cloud service providers to force network traffic from the users 14 to be redirected through the network intermediary.

To ensure security associated with the use of the one or more cloud based services, the enterprise employs control and security measures to detect and contain potential or actual threats to the enterprise's data being communicated to and/or stored on the cloud service providers. In embodiments of the present invention, the enterprise may employ the cloud security system 50 of the present invention to implement cloud activity threat detection based on service action categories. More specifically, the cloud security system 50 is advantageously applied to detect for security incidents, anomalies and threats based on categories of service actions. By providing cloud security based on service action categories rather than individual service actions, effective cloud security can be implemented for massive amount of cloud network activities and even when the exact nature of the cloud-based services is not known.

In embodiments of the present invention, the cloud security system 50 receives the activity logs from the multiple cloud service providers. The activity logs contain network traffic data handled by each cloud service provider on behalf of the enterprise. In some examples, the cloud security system 50 obtains the user activity logs using an application program interface (API) at each cloud service provider 30.

In other examples, the cloud security system 50 obtains the user activity logs from the network intermediary intercepting user network activities. In some embodiments, the user activity logs contain information related to the cloud activity associated with the users, such as the IP addresses of the originating user device, the service actions being taken, and other related information such as the time of the cloud service access, such as the amount of data being accessed, the authentication status, the Geo-location, the communication protocol, and the content type.

In most situations, the enterprise is adopting the use of numerous cloud service providers, with each cloud service provider supporting a different underlying application or applications. Each cloud service provider defines its own set of service actions for supporting its own cloud applications. Examples of cloud-based services include cloud storage services, customer relationship management (CRM) services, information technology (IT) services, or other types of cloud services. Example of service actions can include Create User, Login, File Upload, File Download, and Share File. In one example, the cloud service provider Evernote provides a cloud application designed for note taking, organizing, and archiving. Evernote supports a service action named "Upload a Note". The "Upload a Note" service action can be used to upload meeting notes for storage or upload information for collaboration.

Other Examples of Service Actions: A cloud storage and collaboration service provider called 'Dropbox for Business' allows users to share enterprise data with external collaborators using the service action called "Made the contents of a link visible to anyone with the link". Similarly, 'AzureAD' is a cloud service designed to help enterprise users collaborate with each other. It provides the users with a service action called "Add external user to group" to help them add new users to a collaboration or user group to give them access to the data that is owned/viewed by the existing group of the users. For another example: 'Salesforce.com' is a cloud service provider that helps enable sales and marketing teams track and manage customer data. It provides 'Salesforce.com' administrators a way to change a user's role to add or reduce the amount of data or privileges that the user has. This can be done using a service action called "Assign Role/Sub Role".

An information security officer of the enterprise may be monitoring the cloud activities of the users on behalf of the enterprise. The information security officer may wish to identify suspicious activity from the cloud activity data. However, an information security officer, who is not himself/herself a user of the cloud-based services, may be confronted with monitoring a large amount of unfamiliar cloud activities. Table 2 below illustrates the typical number of service actions associated with cloud service providers. Meanwhile, the information security officer may have no knowledge of or information on what the service actions are for each cloud service provider. It may not be possible for the information security officer to know and become familiar with all of the applications by all of the cloud based services used by the enterprise so that effective monitoring can be implemented. Table 3 below illustrates examples where the service action names may not inform the nature of the service action. It is difficult for the information security officer to identify threats when the officer does not know what the service actions are actually doing.

TABLE 2

Typical number of service actions associated
with cloud service providers

| Cloud Service<br>Provider Name | Number of<br>Service Actions |
|---|---|
| Amazon Web Services | 1000 |
| Exchange Online | 350 |
| Github | 100 |
| Atlassian JIRA | 250 |
| AzureAD | 100 |
| Office 365 | 1000 |
| Slack | 100 |

TABLE 3

Examples of Service Action Names that
tend to be difficult to understand for someone not
familiar with the cloud service.

| Service Action Name | Cloud Service<br>Provider | Service Action<br>Category |
|---|---|---|
| Add Field Configuration Scheme | Atlassian Jira | Administration |
| Associate DHCP Options | Amazon Web Services | Administration |
| Clear Active Sync Device | Exchange Online | Administration |
| Get Identity Mail From Domain Attributes | Amazon Web Services | Data Download |
| Released File Lock | Egnyte | Data Download |
| Web request access modified | OneDrive | Data Sharing |
| Update Direct Messages & Sharing | Jive Hosted | External Data Sharing |

In embodiments of the present invention, the cloud security system 50 of the present invention implements the service action categorization method to perform classification of service actions identified in the cloud activities so that service actions in the cloud activities are grouped into a limited set of service action categories. Security enforcement policy can then be implemented based on the service action categories and applied to all service actions in the same category. Distilling cloud activities into the limited set of service action categories makes it possible to monitor large amount of cloud activities of an enterprise and to effectively detect for suspicious activities. With the service actions associated with all of the cloud based services categorized, an information security officer of the enterprise may monitor the cloud activities based on the limited set of service action categories and may apply enforcement policies based on specific service action categories. To ensure that service action category based cloud security can be reliably implemented, the categorization of the service actions should be accurately done so that effective monitoring can be performed. Accurate service action classification and categorization ensure that real threats are detected and false positive or false negative results during the monitoring operation are avoided. Large amount of false positive or false negative results render the cloud security system ineffective and are thus undesirable.

Figure 2:
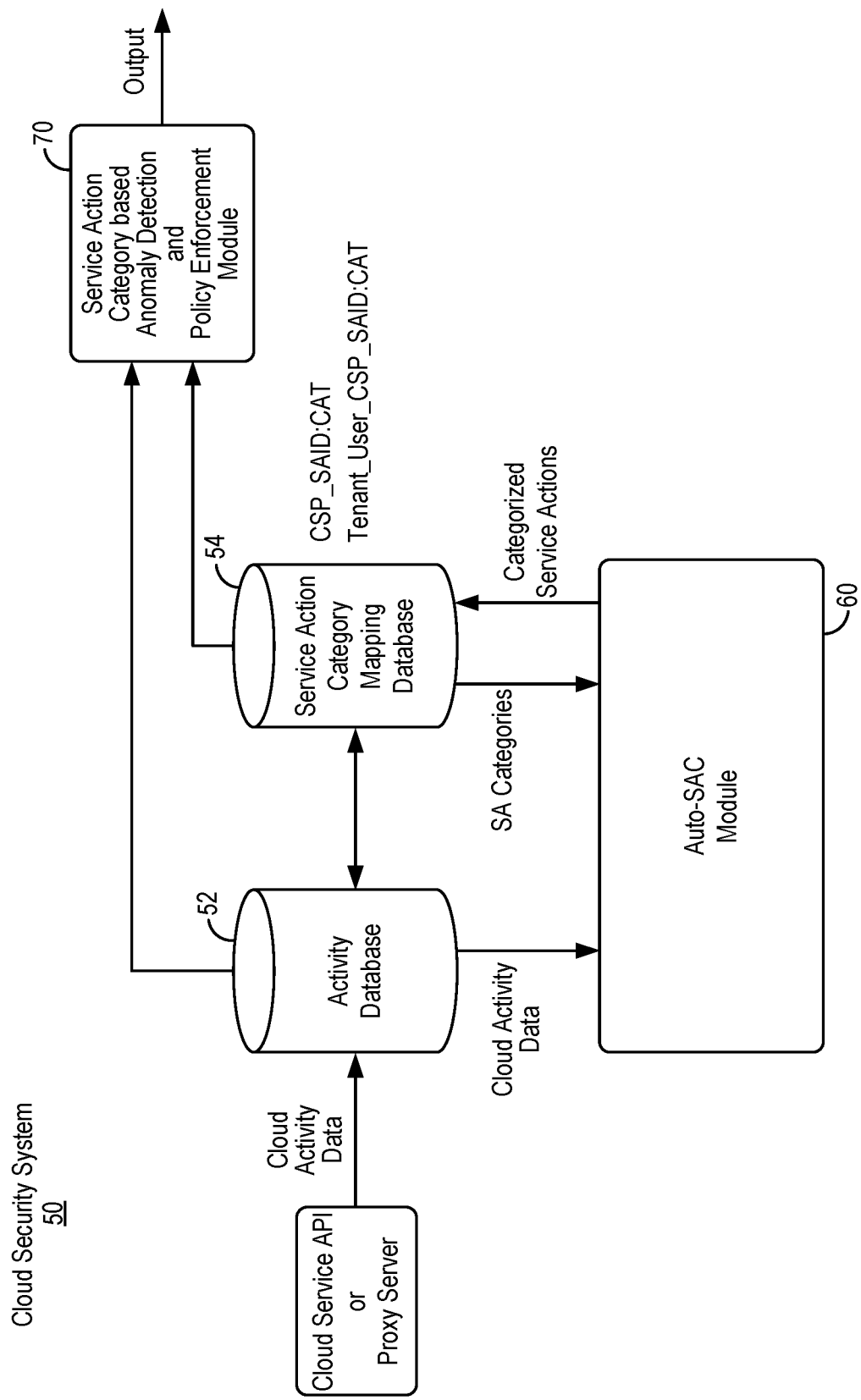
FIG. 2 is a schematic diagram of a service action category based cloud security system in embodiments of the present invention.

FIG. 2 is a schematic diagram of a service action category based cloud security system in embodiments of the present invention. Referring to FIG. 2, the cloud security system 50 receives cloud activity data which can be obtained using an API at the cloud service providers or obtained from a proxy server serving as a network intermediary. The cloud activity data are stored in an activity database 52. The cloud activities may be associated with a single enterprise. Alternately, the cloud security system 50 may be a multi-tenant system and the cloud activities may be associated with the tenants of the system which may include multiple independent enterprises.

The cloud security system 50 includes a service action category mapping database 54 storing the mapping data of each service action of each cloud service provider to a service action category. In some embodiments, the database 54 stores the mapping data in the form of: CSP SAID:CAT, where CSP identifies the cloud service provider, SAID refers to the service action identifier used by the cloud service provider and CAT refers to the category mapped. In another embodiment, the database 54 stores the mapping data in the form of: Tenant User CSP SAID:CAT, where Tenant refers to the name of the tenant at the cloud service provider and User refers to a specific user or a group of users at a particular tenant.

Figure 3:
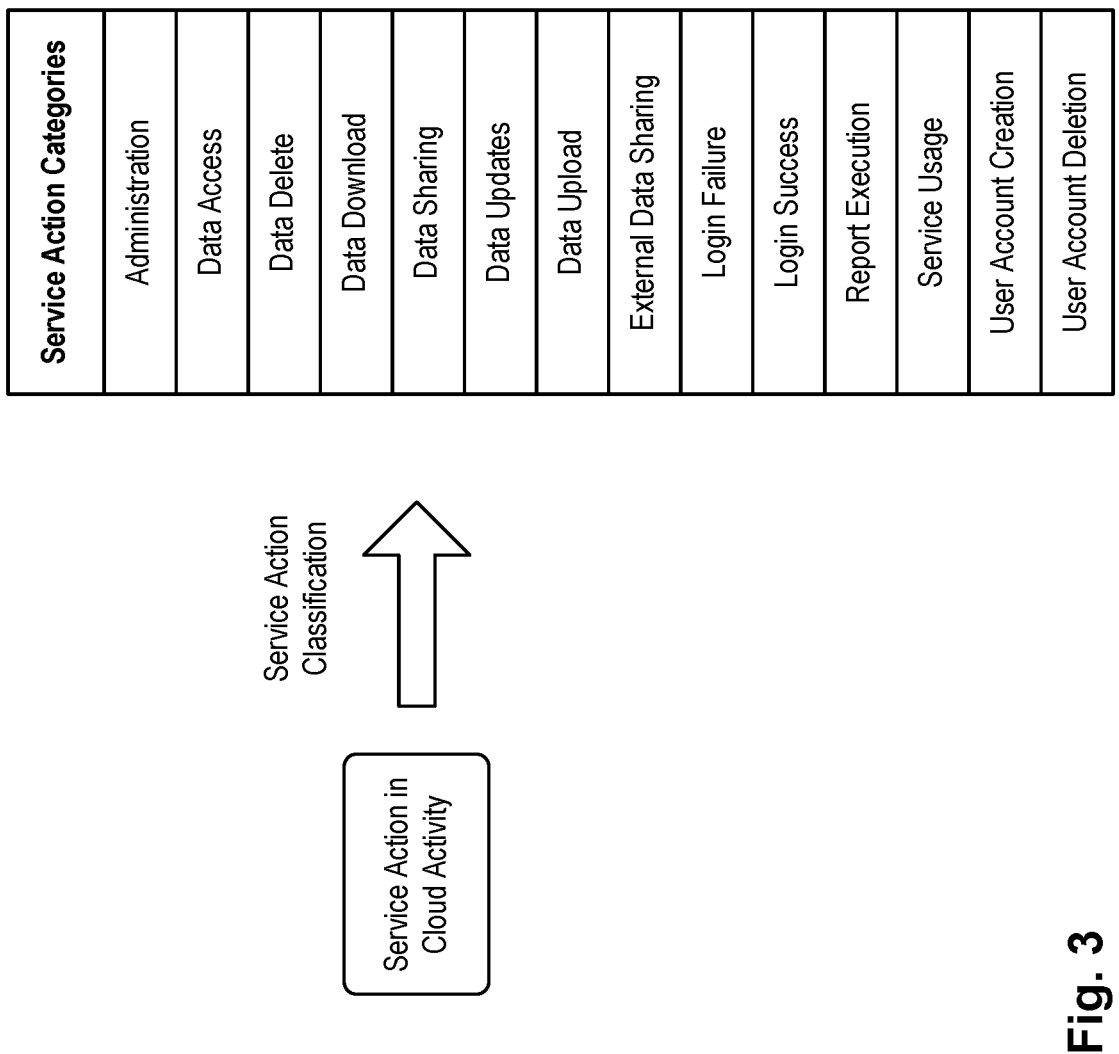
FIG. 3 illustrates the service action categorization method in mapping service actions into a limited set of service action categories in embodiments of the present invention.

The cloud security system 50 operates to map all or most of the service actions in the cloud activity data to a limited set of service action categories. In one embodiment, the cloud security system 50 maps the service actions into fourteen (14) categories, including: Administration, Data Access, Data Delete, Data Download, Data Sharing, Data Updates, Data Upload, External Data Sharing, Login Failure, Login Success, Report Execution, Service Usage, User Account Creation, and User Account Deletion, as illustrated in FIG. 3.

Cloud security system 50 includes an Auto-SAC (service action categorization) module 60 to classify the service action in the cloud activities into the set of categories. The auto-SAC module 60 receives cloud activity data from the activity database 52 and determines any service action that has not yet been categorized. The auto-SAC module 60 processes the uncategorized activities and determines a category for each uncategorized service action in the cloud activities. In embodiments of the present invention, the auto-SAC module 60 implements contextual classification including role identification and session intent and sequence identification. That is, the auto-SAC module 60 incorporates analysis of contextual information of the service action in order to determine the most likely service action category for the uncategorized service action. The auto-SAC module 60 determines a category for the service action being mapped and the service action to category mappings for all the uncategorized service actions are then stored in the mapping database 54.

FIG. 4 illustrates an example of service action category mapping database 54 storing service action to service action category mapping data in some embodiments. The mapping database 54 includes columns identifying the cloud service provider (CSP), the service action name for that cloud service provider and the service action category assigned for each service action. For example, the service action "File Copy" for the cloud service "Box.com" is assigned to the category "Data Sharing." Meanwhile, the service action "File Comment Added" for the cloud service "Box.com" is assigned to the category "Data Access." In another example, the service action "Create Lead" for the cloud service "Salesforce.com" is assigned to the category "Data Access." In yet another example, the service action "StartLogging" for the cloud service "Amazon Web Services" is assigned to the category "Service Usage." The auto-SAC module 60 operates to map each service action in the cloud activity to the limited set of service action categories so that security policies can be applied based on service action categories.

Returning to FIG. 2, with the service action categorized, the cloud security system 50 can then implement threat detection and policy enforcement. The cloud security system 50 includes a service action category based anomaly detection and policy enforcement module 70. The module 70 access the activity database 52 and the mapping database 54. The module 70 uses the mapped categories to evaluate the cloud activities to detect for threats and to enable policy enforcement. In particular, with the service action mapped to a limited set of categories, threat detection and security policies can be applied to monitor a set of cloud activities for threat detection.

For example, an information security officer at an enterprise may wish to monitor all data download activities from all of the cloud service providers. Using the conventional method, the officer would have to learn all of the service action names at all of the cloud service providers that are related to data download activities. However, in embodiments of the present invention, the auto-SAC module 60 analyzes all of the service actions in the cloud activities and classifies the service actions into the predefined list of categories. Thus, the auto-SAC module 60 identifies the service actions in the cloud activities that are related to data download and classifies all the service actions into the "Data Download" category regardless of the name or semantics given to the particular service action and agnostic to the cloud service provider. Thus, the information security officer can perform threat detection on all cloud activities in the "Data Download" category without knowing the specific service action name or label or semantic for each cloud service provider that is associated with data download activity. For example, service actions involving data download may not be include the label "download" in the service action name. In some cases, a service action may use the label "extract" to refer to data download activity. Table 4 and Table 5 below provide more examples. By categorizing all the service actions that are related to data download activities, the information security officer can use the anomaly detection and policy enforcement module 70 to monitor all data download activities by using the "Data Download" category.

TABLE 4

Service Actions that indicate 'Data Downloads'
without using the phrase 'Download'

| Service Action Name | Cloud Service Provider Name |
|---|---|
| Copy Image | Amazon Web Services |
| Data Exported | Salesforce.com |
| Get API Keys | Amazon Web Services |
| Send File as Attachment | Egnyte |

TABLE 5

Service Actions that indicate 'External Data
Sharing' without using the phrase 'Share'

| Service Action Name | Cloud Service Provider Name |
|---|---|
| Add Web Link | Atlassian JIRA |
| Created a link to a file via an API app | Dropbox for Business |
| Send Email To Contact/Lead | Salesforce.com |
| Add external user to group | AzureAD |
| Transferred folder ownership to a non-team member | Dropbox for Business |

Figure 5:
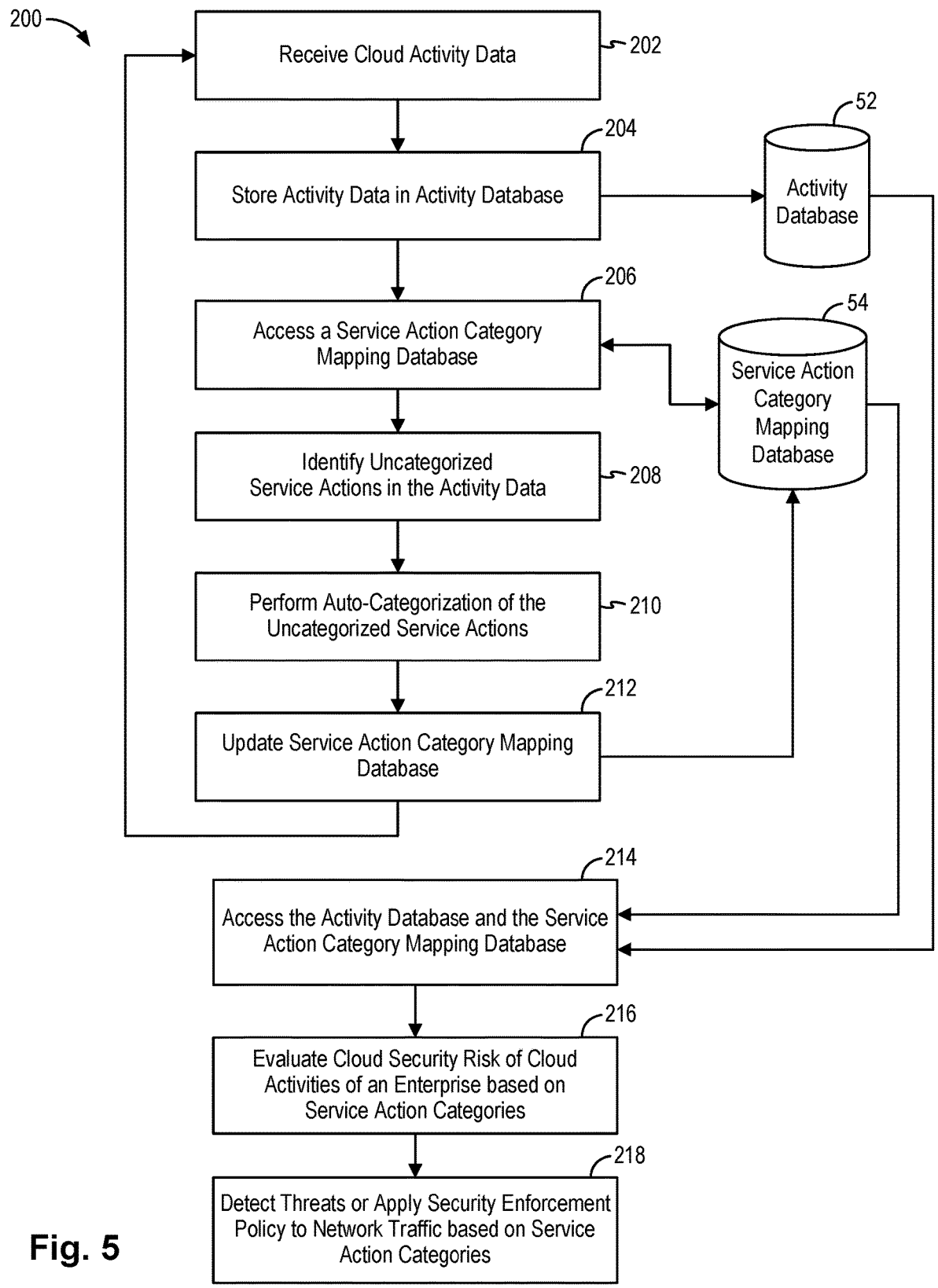
FIG. 5 is a flowchart illustrating a service action category based cloud security method in embodiments of the present invention.

FIG. 5 is a flowchart illustrating a service action category based cloud security method in embodiments of the present invention. Referring to FIG. 5, a cloud security method 200 starts with receiving cloud activity data (202). The cloud activity data may be associated with a particular enterprise or with multiple enterprises. The method 200 stores the cloud activity data in an activity database (204). For example, the cloud activity data may be stored in the activity database 52 of FIG. 2. The method 200 then accesses a service action category mapping database (206). For example, the service action category mapping database may be the mapping database 54 of FIG. 2. The method identifies uncategorized service actions in the cloud activity data (208). The method 200 then performs auto-categorization of the uncategorized service actions (210). Each uncategorized service action is analyzed and mapped to one of a limited set of predetermined categories. For example, each uncategorized service action can be mapped to a set of fourteen service action categories as shown in FIG. 3. The method 200 then updates the service action category mapping database (212). More specifically, the newly mapped service action is stored in the mapping database indicating the service action category to which the service action is mapped. The mapping data may be configured as shown in FIG. 4 to store the service action to category mapping data.

With the service actions in the cloud activity thus categorized, the cloud security method 200 implements cloud security measures by accessing the activity database 52 and the service action category mapping database 54 (214). The method 200 evaluates cloud security risk of cloud activities of an enterprise based on the service action categories (216). For example, cloud activities belonging to the Data Download category may be monitored and evaluated for risk exposure. The method 200 detects cloud security threats or anomalies (218). The method 200 may further apply security enforcement policy to network traffic of the enterprise based on the service action categories.

Figure 6:
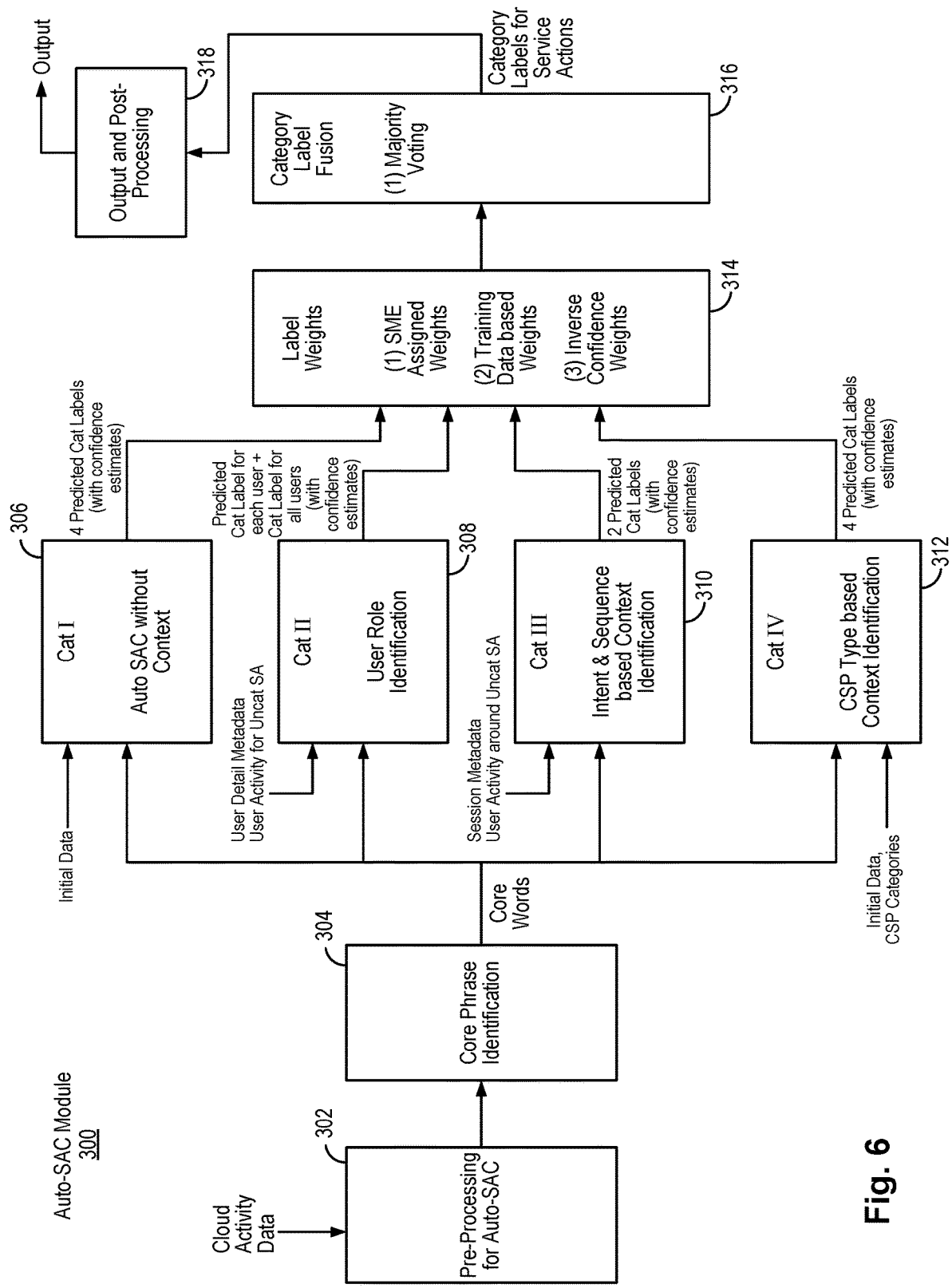
FIG. 6 is a block diagram of the automatic service action categorization (auto-SAC) module in embodiments of the present invention.\

FIG. 6 is a block diagram of the automatic service action categorization (auto-SAC) module in embodiments of the present invention. In some embodiments, the auto-SAC module 300 of FIG. 6 can be used to implement the auto-SAC module 60 in the cloud security system of FIG. 2. Referring to FIG. 6, the auto-SAC module 300 operates to analyze service actions in cloud activities associated with one or more cloud service providers and to assign or map each service action to one of a limited set of service action categories. The limited set of service action categories can be pre-defined by subject matter experts and can be defined to enhance cloud security monitoring.

As described above, each cloud service provider defines its own set of service actions that can be performed in the cloud service. While the cloud service provider can provide definition or categorization of its own service actions—the definition is driven by the cloud service provider and the categorization may be specific for each cloud service provider, which renders category based cloud security difficult to implement. To implement effective security, the auto-SAC module 300 implements a set of service action categories that are agnostic to the cloud service providers. Furthermore, while it may be possible to perform a priori categorization of service actions for a cloud service provider and store the mapping information in the cloud security system, the cloud security system is still faced with the issue of uncategorized service actions as existing cloud service providers may add new service actions that have not yet been mapped or a new cloud service provider is introduced with service actions not yet mapped. The auto-SAC module 300 of the present invention can be implemented in the cloud security system to ensure that all uncategorized service actions are mapped accurately so that service action category based cloud security can be effectively implemented.

Referring to FIG. 6, the auto-SAC module 300 includes a pre-processing module 302 to perform pre-processing of the cloud activity data to identify uncategorized service actions. For example, the pre-processing module 302 identifies new service actions from existing cloud service providers that have not been categorized. The pre-processing module 302 may further identify uncategorized service actions from a new cloud service provider.

The auto-SAC module 300 includes a core phrase identification module 304 configured to identify the core phrase or core words in each of the uncategorized service action. More specifically, the core phrase identification module 304 first transform or translate name or label of the uncategorized service action into a standard phrase, referred herein as "core phrase." Standard phrases or core phrases refer to a set of commonly used name or labels that is equivalent to or that can be used to describe the service action name in the uncategorized service action. After transforming the service action name into the core phrase, the core phrase identification module 304 then split the words in the core phrase into individual core words.

For example, an uncategorized service action may be named as "file transferred". The core phrase identification module 304 first transforms the service action name "file transferred" to "File Transfer" as the core phrase. The module 304 then further split the core phrase "File Transfer" into core words "File" and "Transfer".

In another example, an uncategorized service action may be named as "folder shared". The core phrase identification module 304 first transforms the service action name "folder shared" to "Folder Share" as the core phrase. The module 304 then further split the core phrase "Folder Share" into core words "Folder" and "Share".

In yet another example, an uncategorized service action may be named as "extended folder shared". The core phrase identification module 304 first transforms the service action name "extended folder shared" to "Folder Share" as the core phrase and then further split the core phrase "Folder Share" into core words "Folder" and "Share".

In a last example, an uncategorized service action may be named as "doc shared". The core phrase identification module 304 first transforms the service action name "doc shared" to "File Share" as the core phrase and then further split the core phrase "File Share" into core words "File" and "Share".

With the core words for the uncategorized service action thus generated, the auto-SAC module 300 then analyzes the core words to generate predicted service action categories for the uncategorized service action using one or more of the categorization prediction systems 306 to 312. Each categorization prediction system generates predicated service action categories for the service action with confidence estimates. In the present embodiment, the auto-SAC module 300 is illustrated with four categorization prediction systems. The use of four categorization prediction systems in the present embodiment is illustrative only and not intended to be limiting. In other embodiments, one or more of the categorization prediction systems may be used to generate the predicated service action categories.

In the present embodiment, the auto-SAC module 300 includes a first categorization prediction system 306 that performs service action categorization without context information. The first categorization prediction system 306 receives initial data to use as the bases for the categorization. The initial data contains service action core words and associated service action categories. The initial data may be pre-defined by a subject matter expert. The categorization prediction system 306 compares the cord words generated by module 304 to the initial data to determine one or more predicted categories, each predicted category being associated with a confidence estimate.

In the present embodiment, the categorization prediction system 306 processes the core words in four ways to generate four predicted categories. In particular, the core words are analyzed as: (1) one core word for one cloud service provider; (2) all core words for one cloud service provider; (3) one cord word for all cloud service providers; and (4) all core words for all cloud service providers. By analyzing the core words for the uncategorized service action in this manner, the categorization prediction system 306 generates four predicated category labels, each label associated with its own confidence estimate.

In the present embodiment, the auto-SAC module 300 includes a second categorization prediction system 308 that performs service action categorization using user role identification. The second categorization prediction system 308 receives metadata relating to the user details and also user activities associated with the uncategorized service action and generates a predicated category with confidence estimate based on the role of the user initiating or making the service action. In the present description, the role of the user refers to the role of the user in the enterprise and is often associated with the job title or job function of the user within the enterprise. For example, a user's role can be "administrator" or "marketing" or "engineering."

In the present embodiment, the second categorization prediction system 308 performs user role identification by determining the job function or job title of the user is with respect to the uncategorized service action. That is, the job title of the user or the job function of the user is used to evaluate the core words of the uncategorized service action to predict a suitable service action category. In some cases, metadata describing the user details are available, such as a database of user names and user job titles or an organization chart of the enterprise may be available to the auto-SAC module 300.

In some embodiments, the second categorization prediction system 308 further evaluates the cloud activity of the user around the uncategorized service action to determine the role for the user. In the present embodiment, the second categorization prediction system 308 performs user role identification by evaluating the user cloud activity around the uncategorized service action and comparing to the cloud activity pattern of known users with known role or job title. For example, when a first user has a role in Marketing performs service actions A and C, a second user who also performs service actions A and C will most likely have a role in Marketing.

In some embodiments, the second categorization prediction system 308 uses the user's role identification information to evaluate the core words for the uncategorized service action by evaluating each word for one user, all words for one user, all words for all users. The second categorization prediction system 308 generates a predicted category label for each user and a predicted category label for all users, each label associated with its own confidence estimate.

In some embodiments, the user role identification can be performed as follows. Different users based on their roles (with specific job responsibilities) tend to use a subset of the service actions that the cloud service supports. The user role identification method exploits the information about a user's role in combination with prior knowledge about the types of service actions by other similar users to identify the likely category that the service action belongs to. For example: within a cloud service like Salesforce.com (used to track customer and sales information), the categorization system can estimate the likelihood of the service action categories that the users typically take, such as by using the training data or based on the knowledge of a subject matter expert. For example, an user in a role of 'Administrator' will typically tend to take service actions related to user role provisioning. Accordingly, when an Administrator role user performs a new service action that has not been categorized yet, one can assign the likelihood that the new service action combination belongs to one of the categories "User Account Creation" or "User Account Deletion". Thus, the probability that the new action can belong to other categories is zeroed out.

Similarly, in the Sharepoint cloud service (used for collaboration), training data or subject matter expert knowledge can be used to assess that a user that belongs to a role in the "Marketing Department." A user with a role in the Marketing Department typically takes service actions that belong to the category of 'External Data Sharing' when the action name contains one of phrases {Share, Link, External}, etc., and the category of 'Data Access' when the action name refers to one of {View, Doc, File, Folder, PPT}. These prior training data models can then be used to assign probabilities to new service actions that are performed by users that belong to specific roles/departments based on the bias in the type of actions that such roles typically take.

In the present embodiment, the auto-SAC module 300 includes a third categorization prediction system 310 that performs service action categorization using intent and sequence based contextual identification. The third categorization prediction system 310 receives metadata relating to the connection session and also user activities associated with the uncategorized service action and generates one or more predicated category with confidence estimate based on the intent of the connection session or the sequence of actions associated with the uncategorized service action. The uncategorized service action is defined by the core words generated by module 304.

In the present description, the session intent refers to the overall course of action of the connection session and the session intent is determined by the sequence of actions being performed around the uncategorized service action. For example, the session intent may be account management when the connection session includes a sequence of actions such as account login and changing account password. In another example, the session intent may be file download when the connection session includes a sequence of actions such as accessing a folder in a first location, opening a file in the folder, and saving the file to a second location.

In the present embodiment, the third categorization prediction system 310 performs intent and sequence based contextual identification by identifying the sequence of actions within the connection session including the uncategorized service action and identifying service actions with known service action category. Based on the sequence of actions and the known service action categories, the third categorization prediction system 310 generates two predicted category labels, each label associated with its own confidence estimate.

In one example, an uncategorized service action XYZ is evaluated by the third categorization prediction system 310 as follows. The sequence of actions in the connection session including the service action XYZ is examined. The sequence of action may be:

<User Auth, Login, Pswd Change, XYZ, Pswd Change Email>

In this sequence of actions, there are three office actions in the Administrative category—"User Auth", "Pswd Change", "Pswd Change Email"- and one service action in the Login category. By examining the sequence of action, the categorization prediction system 310 can predict that the unknown service action XYZ is an Administrative type service action and can generate a predicted category as Administrative for service action XYZ.

In another example, an uncategorized service action XYZ is evaluated by the third categorization prediction system 310 by comparing to known sequence of actions. The sequence of action including the unknown service action XYZ may be:

<ADFS token refresh, mail download, XYZ, import contact list>

The sequence of action contains a known signature of service actions. For example, the sequence <ADFS token refresh, mail download, import contact list> is a known sequence of service action and has been categorized as Data Access by subject matter experts. With the service action XYZ inserted into the known signature of service actions, the categorization prediction system 310 can predict that the unknown service action XYZ, being part of the signature of service actions, is a Data Access type service action and the system 310 can generate a predicted category as Data Access for service action XYZ.

In the present embodiment, the auto-SAC module 300 includes a fourth categorization prediction system 312 that performs service action categorization based on the cloud service provider (CSP) type. The fourth categorization prediction system 312 receives initial data to use as the bases for the categorization. The initial data contains service action core words, CSP categories and associated service action categories. The initial data and CSP categories may be pre-defined by a subject matter expert. The categorization prediction system 312 compares the cord words generated by module 304 to the initial data and based on the CSP categories to determine one or more predicted categories, each predicted category being associated with a confidence estimate.

In the present description, CSP categories are defined to cover the different types of cloud service providers. Typically, the CSP categories are defined based on the services provided by the cloud service provider. For example, the CSP categories can include Storage to refer to services providing cloud storage capabilities, for example, Box.com. The CSP categories can also include Sales Admin to refer to services providing sales support capabilities, for example, Salesforce.com.

The fourth categorization prediction system 312 based on CSP type is particularly useful for new cloud service provider added to the cloud security system for which all of the service actions may be uncategorized. The service actions of a new CSP can be categorized by evaluating the type of services provided by the new CSP. For example, when the new CSP is a storage service, the uncategorized service actions of the new CSP can be evaluated with reference to a storage service provider. For example, when the new CSP is a sales-marketing service, the uncategorized service actions of the new CSP can be evaluated with reference to a sales-marketing service provider.

In the present embodiment, the categorization prediction system 312 processes the core words in four ways to generate four predicted categories. In particular, the core words are analyzed as: (1) one core word for one cloud service provider type; (2) all core words for one cloud service provider type; (3) one core word for all cloud service provider types; and (4) all core words for all cloud service provider types. By analyzing the core words for the uncategorized service action in this manner, the categorization prediction system 312 generates four predicated category labels, each label associated with its own confidence estimate.

In the above described embodiments, the auto-SAC module 300 includes four categorization prediction systems. In other embodiments, one or more of the categorization prediction systems may be used to generate the predicted category labels. In some embodiments, the auto-SAC module 300 is implemented using at least one contextual categorization prediction system. In the present description, a "contextual" categorization prediction system refers to a categorization prediction system that uses contextual information associated with the uncategorized service action. As described herein, the second categorization prediction system 308 using user role identification is one example of a contextual categorization prediction system. Furthermore, the third categorization prediction system 310 using intent and sequence based context identification is another example of a contextual categorization prediction system. Using a contextual categorization prediction system improves the accuracy of the category prediction by auto-SAC module 300.

The auto-SAC module 300, using the four categorization prediction systems, generates a set of predicted service action category labels, each label associated with a given confidence estimate. The auto-SAC module 300 includes a weighing module 314 where each predicted category label is evaluated or weighed to increase or decrease the confidence estimate. In the present embodiment, the predicted category labels are evaluated by three weighing methods and the weights calculated by the methods are summed to increase or decrease the confidence estimate. In other embodiments, the weighing module 314 implements one or more weighting methods to apply weights to the predicted category labels.

In the present embodiment, the weighing module 314 implements a first weighing method being the SME (subject matter expert) assigned weights. That is, a subject matter expert may predefine weights to be applied to the various predicted category label based on the prediction method used. The weighing module 314 further implements a second weighing method being the Training Data based weights. For example, known service actions and categories are provided to the prediction systems and the predicted labels thus generated are compared with the known category to determine the accuracy of the prediction. Prediction systems that generate more accurate category label predictions may be given more weights.

Lastly, in the present embodiment, the weighing module 314 further implements a third weighing method being an Inverse Confidence weights. Inverse Confidence weighing uses predictions from two prediction systems and determines how often the prediction is wrong in one prediction system but similar to the other prediction system. Inverse Confidence weighing also determines how often the prediction is wrong in one prediction system but dissimilar to the other prediction system.

The weighing module 314 applies the weighing methods to each predicted category label generated by the prediction systems 306 to 316 and generates summed weights to increase or decrease the confidence estimate of each predicted category label.

With the predicted category labels property weighted, the auto-SAC module 300 includes a category label fusion module 316 to select a predicted category label for the uncategorized service action. In one embodiment, the category label fusion module 316 operates based on majority voting. That is, the predicted category label with the most confidence or highest confidence estimate is selected as the assigned category label for the service action.

In some cases, the category label fusion module 316 may establish a minimum confidence threshold for the predicted category label. In the event that the predicted category label with the highest confidence estimate does not meet the minimum confidence threshold, the category label fusion module 316 may generate an indication that the categorization has failed for this particular uncategorized service action.

With a category label selected for the uncategorized service action, the auto-SAC module 300 includes an output and post-processing module 318 to perform post categorization operations. In one embodiment, the output and post-processing module 318 provides the mapping information for the service action, that is, the category label mapped to the service action, to the mapping database for storage. The output and post-processing module 318 may generate an alert in the event that an indication of failed categorization is generated by the category label fusion module 316.

In embodiments of the present invention, the auto-SAC module 300 can be applied effectively to map cloud service actions to a limited set of service action categories so that accurate categorization can be realized. The auto-SAC module 300 can perform service action categorization with high level of confidence. That is, the auto-SAC module 300 can map a service action category to an uncategorized service action with high level of confidence that the mapping is correct. With highly accurate service action categorization, highly effective service action category based cloud security can be realized.

Figure 7:
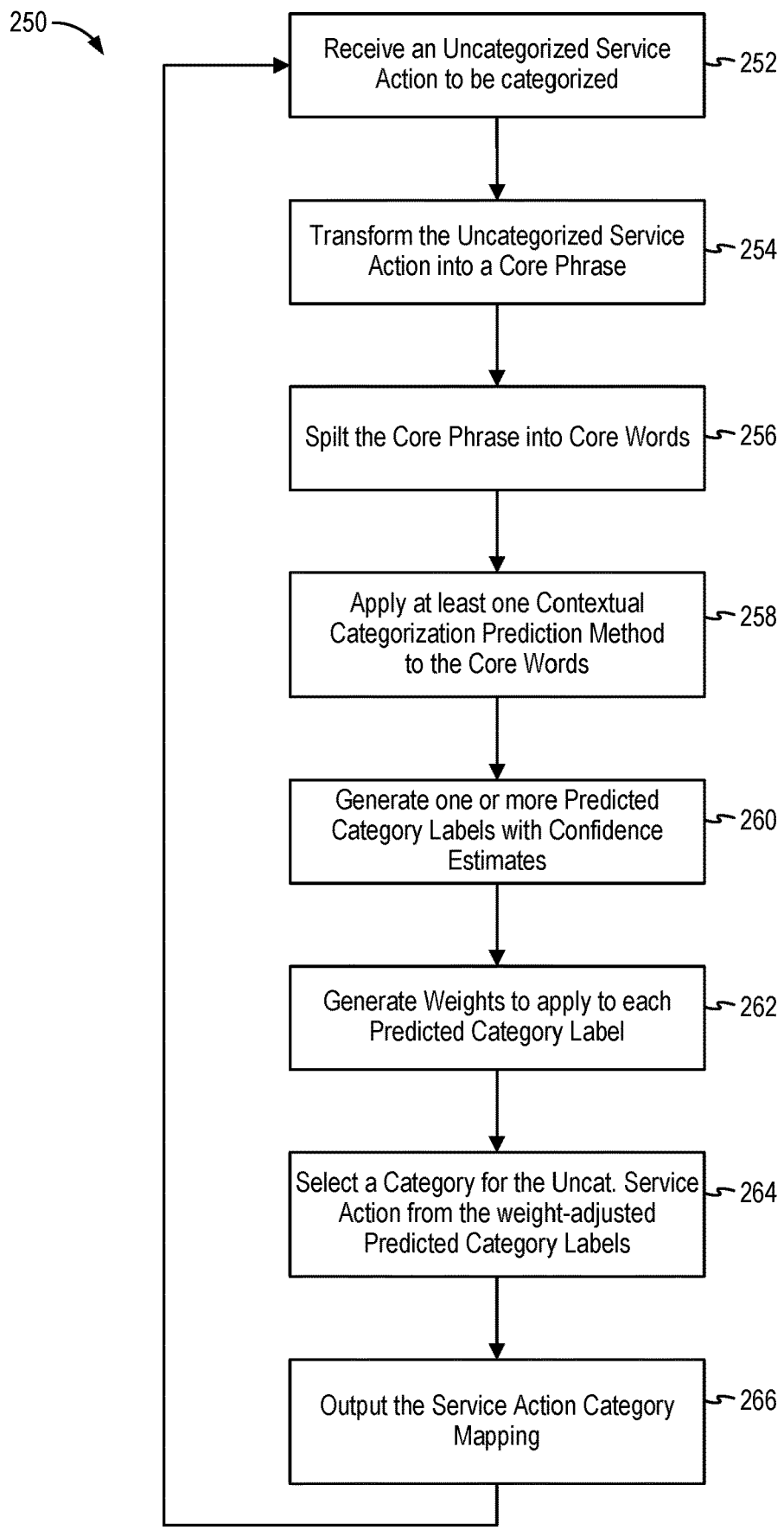
FIG. 7 is a flowchart illustrating service action categorization method in embodiments of the present invention.

FIG. 7 is a flowchart illustrating service action categorization method in embodiments of the present invention. The service action categorization method of FIG. 7 can be used to implement the auto-categorization process of the uncategorized service actions in the cloud security method 200 of FIG. 5. Referring to FIG. 7, an auto-categorization method 250 starts with receiving an uncategorized service action to be categorized (252). For example, the method 250 can perform per-processing of cloud activity data to identify the uncategorized service action.

The method 250 then transforms the uncategorized service action into a core phrase (254). For example, an uncategorized service action "File Shared" may be transformed into a core phrase "File Share". The method 250 then splits the core phrase into individual core words (256). With the cord words associated with the uncategorized service action thus generated, the method 250 applies at least one contextual categorization prediction method to the core words (258). In one example, the method 250 applies a contextual categorization prediction method using user role identification to predict the category label for the uncategorized service action. In another example, the method 250 applies a contextual categorization prediction method using intent and sequence based contextual identification to predict the category label for the uncategorized service action.

As a result of applying the contextual categorization prediction method to the core words, the method 250 generates one or more predicted category labels, each label being associated with a confidence estimate (260). The method 250 then applies weighing methods to generate weights which are applied to each of the predicted category labels generated (262). The weights may increase or decrease the confidence estimates of the predicted category labels.

The method 250 then selects a category for the uncategorized service action from the weight-adjusted predicted category labels (264). For example, in some embodiments, the category with the highest confidence estimate is selected for the service action. The method then outputs the service action to category mapping (266). For example, the service action to category mapping can be stored in a mapping database. The method 250 can then repeats to process another uncategorized service action.

In some embodiments, the selected category may be presented to a user or an administrator to confirm the selected category. For example, if confidence estimate is too low for all of the predicted categories, then method 250 may seek manual confirmation of a category selection.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of implementing cloud security in an enterprise, the method comprising:
   receiving, at a processor, cloud activity data associated with the enterprise;
   storing the cloud activity data in an activity database;
   accessing, using the processor, a service action category mapping database, the service action category mapping database containing mapping data for service actions to a first set of service action categories, wherein each of the first set of service action categories describes a permitted and intended function that is performed by each of a plurality of service actions in the service action category;
   identifying, using the processor, an uncategorized service action associated with a first cloud service provider in the cloud activity data;
   performing, using the processor, categorization of the uncategorized service action using at least one contextual categorization prediction method to map the uncategorized service action to a service action category in the first set of service action categories; and
   storing the category mapping of the uncategorized service action in the service action category mapping database,
   wherein the service action category mapping database and the activity database are accessed to evaluate cloud security risk of cloud activities based on the first set of service action categories and to detect cloud security threats using the first set of service action categories.

2. The method of claim 1, further comprising:
   applying security enforcement policy to cloud activities of the enterprise based on the first set of service action categories.

3. The method of claim 1, wherein performing, using the processor, categorization of the uncategorized service action using at least one contextual categorization prediction method to map the uncategorized service action to a service action category in the first set of service action categories comprises:
   performing categorization of the uncategorized service action by identifying a role of the user associated with the uncategorized service action.

4. The method of claim 3, wherein performing categorization of the uncategorized service action by identifying a role of the user associated with the uncategorized service action comprises:
   performing categorization of the uncategorized service action by identifying a role of the user within the enterprise and evaluating the cloud activity of the user around the time of the uncategorized service action.

5. The method of claim 3, wherein performing categorization of the uncategorized service action by identifying a role of the user associated with the uncategorized service action comprises:
   performing categorization of the uncategorized service action by identifying a job title or a job function of the user within the enterprise.

6. The method of claim 1, wherein performing, using the processor, categorization of the uncategorized service action using at least one contextual categorization prediction method to map the uncategorized service action to a service action category in the first set of service action categories comprises:
   performing categorization of the uncategorized service action by identifying an intent and sequence of a connection session containing the uncategorized service action.

7. The method of claim 6, wherein performing categorization of the uncategorized service action by identifying an intent and sequence of a connection session containing the uncategorized service action comprises:
   evaluating the sequence of service actions within the connection session including the uncategorized service action;
   identifying service actions with previously mapped service action categories; and
   generating a predicted service action category for the uncategorized service action based on the previously mapped service action categories for the service actions within the connection session.

8. The method of claim 6, wherein performing categorization of the uncategorized service action by identifying an intent and sequence of a connection session containing the uncategorized service action comprises:
   evaluating the sequence of service actions within the connection session including the uncategorized service action;
   identifying a signature of service actions in the sequence of service actions; and
   generating a predicted service action category for the uncategorized service action based on the signature of service actions.

9. A method of implementing cloud security in an enterprise, the method comprising:
   receiving, at a processor, cloud activity data associated with the enterprise;
   storing the cloud activity data in an activity database;
   accessing, using the processor, a service action category mapping database, the service action category mapping database containing mapping data for service actions to a first set of service action categories, wherein each of the first set of service action categories describes a permitted and intended function that is performed by each of a plurality of service actions in the service action category;
   identifying, using the processor, an uncategorized service action associated with a first cloud service provider in the cloud activity data;

performing, using the processor, categorization of the uncategorized service action using at least one contextual categorization prediction method to map the uncategorized service action to a service action category in the first set of service action categories, by at least:
  transforming using the processor a name of the uncategorized service action into a core phrase;
  dividing the core phrase into core words;
  analyzing the core words using the contextual categorization prediction method to generate a plurality of predicted category labels for the uncategorized service action, each predicted category label being associated with a confidence estimate;
  determining a weight to apply to each of the plurality of predicted category labels, the weight increasing or decreasing the confidence estimate for each of the plurality of predicted category labels; and
  selecting the service action category to map to the uncategorized service action from the plurality of predicted category labels based on the confidence estimates; and
storing the category mapping of the uncategorized service action in the service action category mapping database,
wherein the service action category mapping database and the activity database are accessed to evaluate cloud security risk of cloud activities based on the first set of service action categories and to detect cloud security threats using the first set of service action categories.

10. The method of claim 9, wherein determining a weight to apply to each of the plurality of predicted category labels, the weight increasing or decreasing the confidence estimate for each of the plurality of predicted category labels comprises:
  determining the weight for each predicted category label using one or more weighing methods selected from subject matter expert assigned weights, training data based weights, and inverse confidence weights.

11. The method of claim 9, wherein selecting the service action category to map to the uncategorized service action from the plurality of predicted category labels based on the confidence estimates comprises:
  selecting the predicted category label with the highest confidence estimate as the service action category to map to the uncategorized service action.

12. A system for implementing cloud security for an enterprise, the system comprising:
  a memory; and
  a processor in communication with the memory, the processor being programmed to:
    receive cloud activity data associated with the enterprise;
    store the cloud activity data in an activity database;
    access a service action category mapping database, the service action category mapping database containing mapping data for service actions to a first set of service action categories, wherein each of the first set of service action categories describes a permitted and intended function that is performed by each of a plurality of service actions in the service action category;
    identify an uncategorized service action associated with a first cloud service provider in the cloud activity data;
    perform categorization of the uncategorized service action using at least one contextual categorization prediction method to map the uncategorized service action to a service action category in the first set of service action categories;
    store the category mapping of the uncategorized service action in the service action category mapping database,
    wherein the service action category mapping database and the activity database are accessed to evaluate cloud security risk of cloud activities based on the first set of service action categories and to detect cloud security threats using the first set of service action categories.

13. The system recited in claim 12, wherein the processor is further programmed to:
  perform categorization of the uncategorized service action by identifying a role of the user associated with the uncategorized service action.

14. The system recited in claim 13, wherein the processor is further programmed to:
  perform categorization of the uncategorized service action by identifying a role of the user within the enterprise and evaluating the cloud activity of the user around the time of the uncategorized service action.

15. The system recited in claim 13, wherein the processor is further programmed to:
  perform categorization of the uncategorized service action by identifying a job title or a job function of the user within the enterprise.

16. The system recited in claim 12, wherein the processor is further programmed to:
  perform categorization of the uncategorized service action by identifying an intent and sequence of a connection session containing the uncategorized service action.

17. The system recited in claim 16, wherein the processor is further programmed to:
  evaluate the sequence of service actions within the connection session including the uncategorized service action;
  identify service actions with previously mapped service action categories; and
  generate a predicted service action category for the uncategorized service action based on the previously mapped service action categories for the service actions within the connection session.

18. The system recited in claim 16, wherein the processor is further programmed to:
  evaluate the sequence of service actions within the connection session including the uncategorized service action;
  identify a signature of service actions in the sequence of service actions; and
generate a predicted service action category for the uncategorized service action based on the signature of service actions.

* * * * *